United States Patent
Andoh et al.

(10) Patent No.: US 7,487,714 B2
(45) Date of Patent: Feb. 10, 2009

(54) STEAM COOKER

(75) Inventors: Yuji Andoh, Yamatokooriyama (JP); Shinya Ueda, Yamatotakada (JP); Kazuyuki Matsubayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 35 days.

(21) Appl. No.: 11/596,433

(22) PCT Filed: May 9, 2005

(86) PCT No.: PCT/JP2005/008416

§ 371 (c)(1), (2), (4) Date: Nov. 14, 2006

(87) PCT Pub. No.: WO2005/111508

PCT Pub. Date: Nov. 24, 2005

(65) Prior Publication Data

US 2007/0227364 A1  Oct. 4, 2007

(30) Foreign Application Priority Data

May 14, 2004 (JP) ............................. 2004-144884

(51) Int. Cl.
 *A23L 1/00* (2006.01)
(52) U.S. Cl. .............................. 99/330; 99/331; 99/403; 219/401
(58) Field of Classification Search ........... 99/327–333, 99/403–418, 483, 444–450; 219/400, 401, 219/430, 433; 126/20, 369; 426/510, 511, 426/523

See application file for complete search history.

(56) References Cited

U.S. PATENT DOCUMENTS

| 4,281,636 A | * | 8/1981 | Vegh et al. ................... 126/369 |
| 4,552,123 A | * | 11/1985 | Birkner et al. ................ 126/20 |
| 6,008,482 A | | 12/1999 | Takahashi et al. |
| 6,152,024 A | * | 11/2000 | Tippmann .................... 99/472 |
| 6,175,100 B1 | * | 1/2001 | Creamer et al. ............. 219/401 |

(Continued)

FOREIGN PATENT DOCUMENTS

JP  54-59372 A  5/1979

(Continued)

*Primary Examiner*—Timothy F. Simone
(74) *Attorney, Agent, or Firm*—Birch, Stewart, Kolasch & Birch, LLP

(57) ABSTRACT

In a steam cooker, for heating of a food which is a mass of granular matters or linear matters such as rice or chow mein, a steam superheater is not turned on or is turned on with a very weak electric power so that steam supplied from steam supply pipes (94A to 94C) is substantially not superheated. Steam of 80° C. to 90° C. derived from the steam supply pipe (94B) is jetted out right downward from an opening (111*a*) of a steam jet pipe (111). Then, steam located around an end portion of the steam jet pipe (111) in a tray-shaped case (51) is pulled in by steam jetted out from the opening (111*a*), so that a large amount of steam is jetted against a bowl of rice or a dish of chow mein. As a result, surfaces of, for example, rice grains are prevented from immediately going beyond 100° C., so that condensation at the surfaces of the rice grains is efficiently achieved, and supply of condensed latent heat and penetration of condensed water (hot water) to the rice grains is efficiently achieved.

11 Claims, 8 Drawing Sheets

U.S. PATENT DOCUMENTS

| | | | | |
|---|---|---|---|---|
| 6,230,612 | B1 * | 5/2001 | Rossi | 99/446 |
| 6,237,469 | B1 * | 5/2001 | Stritzl et al. | 99/330 |
| 6,310,325 | B1 * | 10/2001 | Colburn | 219/401 |
| 6,453,802 | B1 * | 9/2002 | Manganiello et al. | 99/330 |
| 6,516,709 | B1 * | 2/2003 | Lin | 99/331 |
| 6,603,099 | B2 * | 8/2003 | Gouthiere | 219/432 |
| 6,668,707 | B2 * | 12/2003 | Joshi et al. | 99/417 |
| 7,208,702 | B2 * | 4/2007 | Choi | 219/401 |

FOREIGN PATENT DOCUMENTS

| | | |
|---|---|---|
| JP | 54-136398 U | 9/1979 |
| JP | 54-127769 A | 10/1979 |
| JP | 55-41706 U | 3/1980 |
| JP | 2515033 Y2 | 8/1996 |
| JP | 9-4849 A | 1/1997 |
| JP | 2002-153380 A | 5/2002 |
| JP | 2003-262338 A | 9/2003 |
| JP | 2004-138346 A | 5/2004 |

* cited by examiner

STEAM COOKER

TECHNICAL FIELD

This invention relates to a steam cooker.

BACKGROUND ART

Heretofore, as a steam cooking device for cooking an object to be cooked such as food by using steam, there is a one in which steam is jetted into a cooking casing (see JP 2515033 Y). In this steam cooking device, a steam supply pipe having a steam jet nozzle portion is provided inside a cooking casing so that steam from a steam generation means is jetted from the steam jet nozzle portion toward the food within a food tray via the steam supply pipe.

However, the conventional steam cooking device shown above, in which the steam supply pipe having the steam jet nozzle portion is exposed inside the cooking casing, has such problems as poor cleanability and usability, particularly as household cooking equipment. Further, since steam is only jetted out toward inside of the food tray from the steam jet nozzle portion in which holes are arrayed in line at a lower portion of one pipe, there is a problem that in heating of a food that is a mass of granular matters or linear matters, such as in heating of a bowl of rice, steam cannot be concentratedly jetted to the food, resulting in a poor heating efficiency.

SUMMARY OF THE INVENTION

Accordingly, an object of the present invention is to provide a steam cooker capable of efficiently heating food, whichever the food is a mass of granular matters or linear matters or a massive one having a large surface area.

In order to accomplish the above object, a steam cooker according to the present invention comprises:

a steam generator for generating steam;

a steam temperature-raising device for raising, by a heater, a temperature of steam generated by the steam generator and supplied from a plurality of steam supply ports to generate superheated steam;

one or more steam supply pipes for leading steam generated by the steam generator to the steam supply ports of the steam temperature-raising device;

a heating chamber which has one or more steam outlets provided in its ceiling and which serves for heating one or more objects to be cooked; and a steam jet pipe for leading steam generated by the steam generator to the heating chamber and jetting (i.e. emitting) the steam into the chamber wherein the objects to be cooked within the heating chamber are heated by steam jetted out (i.e. emitting) from the steam jet pipe and superheated steam supplied from the steam temperature-raising device and blown out (i.e. discharging) from the steam outlets.

In the steam cooker with the above construction, steam generated by the steam generator, becoming steam of 80° C. to 90° C. as an example, is jetted against the object to be cooked from the steam jet pipe. Accordingly, for example, the heater of the steam temperature-raising device is turned off, and supply of the steam to the steam temperature-raising device by the steam supply pipe is stopped. As a result, in the case where the object to be cooked is a mass of granular matters or linear matters such as rice or chow mein, surfaces of the granular matters or linear matters can be prevented from immediately going beyond 100° C. That is, condensation of steam at the surfaces of rice grains as an example is efficiently achieved, and supply of condensed latent heat and penetration of condensed water (hot water) to the rice grains are efficiently achieved.

Also, a steam cooker according to the present invention comprises:

a steam generator for generating steam;

a steam temperature-raising device for raising, by a heater, a temperature of steam generated by the steam generator and supplied from a plurality of steam supply ports to generate superheated steam; and a heating chamber which has steam outlets provided in its ceiling and which serves for heating one or more objects to be cooked by superheated steam supplied from the steam temperature-raising device and blown out from the steam outlets, wherein one of the steam outlets provided in the ceiling of the heating chamber is located at a generally center of the ceiling, the steam cooker further comprising:

a steam jet pipe which is provided within the steam temperature-raising device and whose one end is connected to any one of the plurality of steam supply ports in the steam temperature-raising device and whose other end is bent toward the heating chamber, an opening of the other end being so placed that a projection of the opening onto the ceiling of the heating chamber is positioned within the steam outlet provided at the generally center of the ceiling; and heater turn-on control means for turning on and off the heater, wherein the object to be cooked within the heating chamber can be heated also by steam derived from the steam jet pipe.

In the steam cooker with the above construction, when the heater of the steam temperature-raising device is turned off by the heater turn-on control means, steam generated by the steam generator and supplied from the plurality of steam supply ports to the steam temperature-raising device is not increased in temperature. As a result, steam of 80° C. to 90° C. as an example supplied from any one of the plurality of steam supply ports to the steam jet pipe is jetted, as it is, effectively against the object to be cooked from the steam outlet provided at the generally center of the ceiling of the heating chamber. Therefore, in the case where the object to be cooked is a mass of granular matters or linear matters such as rice or chow mein, surfaces of the granular matters or linear matters can be prevented from immediately going beyond 100° C. That is, condensation of steam at the surfaces of rice grains as an example is efficiently achieved, and supply of condensed latent heat and penetration of condensed water (hot water) to the rice grains is efficiently achieved.

In one embodiment, a diameter of the steam outlet provided at the generally center of the ceiling in the heating chamber is larger than an outside diameter of the opening of the other end of the steam jet pipe, and the other end of the steam jet pipe is located closer to the steam temperature-raising device than the steam outlet provided at the generally center of the ceiling in the heating chamber.

In the steam cooker of the above embodiment, steam located around the steam jet pipe within the steam temperature-raising device is pulled in by the ejector effect of steam jetted out from the opening of the other end of the steam jet pipe, so that a large amount of steam is jetted against the object to be cooked that is a mass of the granular matters or linear matters. Therefore, for example, a bowl of rice can be heated uniformly in shorter time.

A steam cooker of one embodiment comprises a steam suction ejector for sucking steam generated by the steam generator and blowing out the steam to each of the steam supply ports in the steam temperature-raising device.

In the steam cooker of the above embodiment, steam that has passed through the steam jet pipe is jetted out at a very high speed from the opening of the other end of the steam jet pipe by the steam suction ejector function. Therefore, steam located around the steam jet pipe within the steam temperature-raising device is pulled in more effectively by steam jetted out from the opening of the steam jet pipe, so that a larger amount of steam is jetted against the object to be cooked.

A steam cooker of one embodiment comprises opening/closing means for opening and closing the steam outlet provided at the generally center of the ceiling of the heating chamber.

In the steam cooker of the above embodiment, the steam outlet provided at the generally center of the ceiling of the heating chamber is closed by the opening/closing means, and moreover the heater of the steam temperature-raising device is turned on by the heater turn-on control means. Then, steam of 80° C. to 90° C. as an example supplied to the steam jet pipe is not jetted against the object to be cooked from the steam outlet provided at the generally center of the ceiling of the heating chamber, but returned into the steam temperature-raising device. Then, superheated steam of 100° C. or higher heated by the steam temperature-raising device is jetted against the object to be cooked from the steam outlets provided at the ceiling of the heating chamber and opened. Therefore, in the case where the object to be cooked is a massive lump having a large surface area such as a lump of meat, condensed latent heat of superheated steam is given to the a lump of meat as an example, and moreover condensed water (hot water) of 100° C. is penetrated into the lump of meat so that the internal temperature can be raised. Thus, a good-finished, uniform cooking can be achieved.

That is, according to this embodiment, by executing the opening/closing of the steam outlet provided at the generally center of the ceiling of the heating chamber by the opening/closing means as well as the turning-on and -off of the heater of the steam temperature-raising device by the heater turn-on -control means, both the heating of an object to be cooked that is a mass of granular matters or linear matters as well as the heating of an object to be cooked that is a massive lump having a large surface area can be achieved efficiently.

In one embodiment, out of the steam outlets provided in the ceiling of the heating chamber, one or more steam outlets other than the steam outlet provided at the generally center of the ceiling are provided outside a region having a specified radius centered on the steam outlet provided at the generally center of the ceiling.

In the above embodiment, steam located around the steam jet pipe within the steam temperature-raising device is pulled in by steam jetted out from the opening of the steam jet pipe. Thus, a large amount of steam of 80° C. to 90° C. as an example can effectively be jetted against the object to be cooked that is a mass of granular matters or linear matters without any impairment of the jet-out effect in the jet-out to the heating chamber.

Also, a steam cooker according to the present invention comprises:

a steam generator for generating steam;

a steam temperature-raising device for raising, by a heater, a temperature of steam generated by the steam generator and supplied from a plurality of steam supply ports to generate superheated steam; and a heating chamber which has steam outlets provided in its ceiling and which serves for heating an object to be cooked by superheated steam supplied from the steam temperature-raising device and blown out from the steam outlets, wherein one of the steam outlets provided in the ceiling of the heating chamber is provided at a generally center of the ceiling, the steam cooker further comprising:

a steam jet pipe which is provided within the steam temperature-raising device and whose one end is connected to any one of the plurality of steam supply ports in the steam temperature-raising device and whose other end extends up to a generally central portion of the ceiling in the heating chamber and is opened;

an air rectification plate which is provided opposite to the other-end side open end of the steam jet pipe and which serves for changing a jet-out direction of steam jetted from the steam jet pipe to a direction toward the steam outlet provided at the generally center of the ceiling;

heater turn-on control means for turning on and off the heater, wherein the object to be cooked within the heating chamber can be heated also by steam supplied via the steam jet pipe and the air rectification plate.

In the steam cooker with the above construction, when the heater of the steam temperature-raising device is turned off by the heater turn-on control means, steam generated by the steam generator and supplied from the plurality of steam supply ports to the steam temperature-raising device is not increased in temperature. As a result, steam of 80° C. to 90° C. as an example supplied from any one of the plurality of steam supply ports to the steam jet pipe is jetted, as it is changed in direction by the air rectification plate, against the object to be cooked from the steam outlet provided at the generally center of the ceiling of the heating chamber. Therefore, in the case where the object to be cooked is a mass of granular matters or linear matters such as rice or chow mein, surfaces of the granular matters or linear matters can be prevented from immediately going beyond 100° C. That is, condensation of steam at the surfaces of rice grains as an example is efficiently achieved, and supply of condensed latent heat and penetration of condensed water (hot water) to the rice grains is efficiently achieved.

As apparent from the above description, the steam cooker according to the present invention is capable of jetting steam generated by the steam generator against an object to be cooked from the steam jet pipe as steam of 80° C. to 90° C. as an example.

Also, the steam cooker of the invention is capable of, with the heater of the steam temperature-raising device turned off by the heater turn-on control means, jetting steam of 80° C. to 90° C. as an example supplied to the steam jet pipe, as it is, effectively against the object to be cooked from the steam outlet provided at the generally center of the ceiling of the heating chamber.

Further, the steam cooker of the invention is capable of, with the heater of the steam temperature-raising device turned off by the heater turn-on control means, jetting steam of 80° C. to 90° C. as an example supplied to the steam jet pipe, as it is changed in its jet-out direction by the air rectification plate, effectively against the object to be cooked from the steam outlet provided at the generally center of the ceiling of the heating chamber.

Accordingly, in the case where the object to be cooked is a mass of granular matters or linear matters such as rice or chow mein, surfaces of the granular matters or linear matters can be prevented from immediately going beyond 100° C. Thus, condensation of steam at the surfaces of the granular matters or linear matters can efficiently be achieved.

That is, according to the present invention, supply of condensed latent heat and penetration of condensed water (hot water) to, for example, rice grains can efficiently be achieved, so that a bowl of rice can be heated in short time.

DETAILED DESCRIPTION OF THE INVENTION

Figure 1:
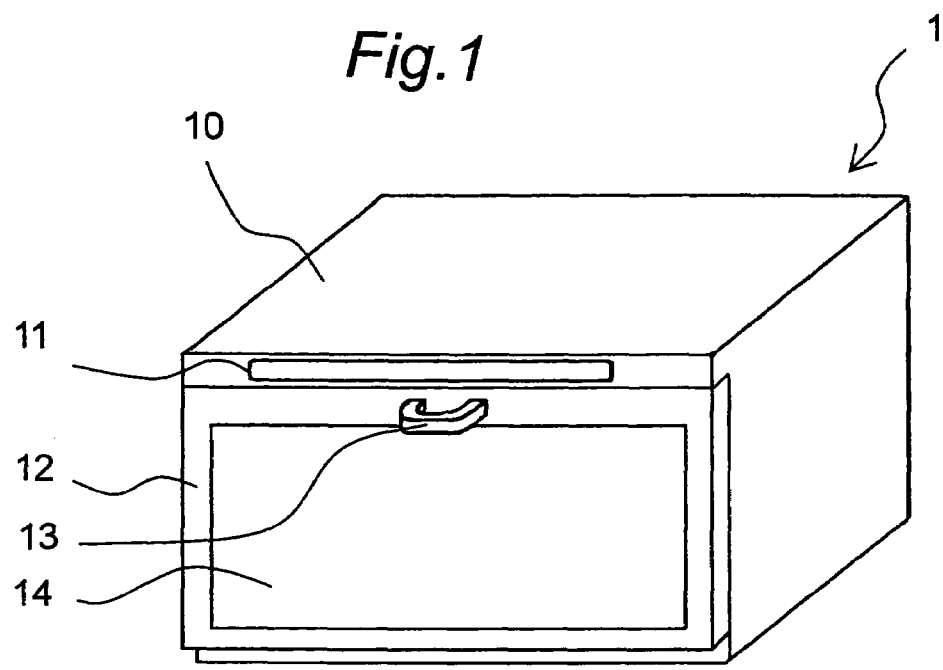
FIG. 1 is a perspective view showing an external appearance of a steam cooker according to the present invention.

The invention will be described using examples shown in the drawings.

FIG. 1 is an external perspective view of a steam cooker according to one embodiment of the invention. In the steam cooker, a front upper portion of a rectangular parallelepiped cabinet 10 is provided with an operation panel 11, and a door 12, which is rotatable around a lower end side of the cabinet, is provided under the operation panel 11. An upper portion of the door 12 is provided with a handle 13, and the door 12 is provided with a window 14 made of thermal glass.

Figure 2:
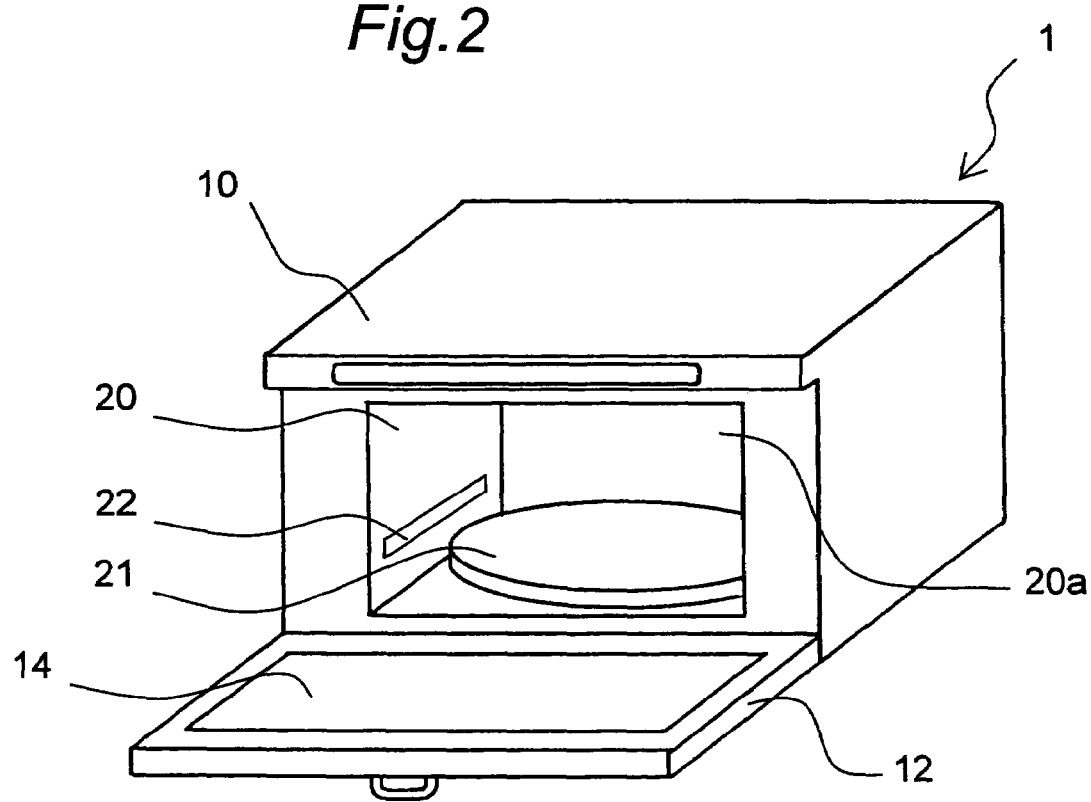
FIG. 2 is a perspective view showing an external appearance of the steam cooker shown in FIG. 1 with its door opened.

FIG. 2 is an external perspective view of the steam cooker 1 with the door 12 opened. A rectangular parallelepiped heating chamber 20 is provided in the cabinet 10. The heating chamber 20 has an opening 20a on its front side facing the door 12, and side surfaces, a bottom surface and a top surface of the heating chamber 20 are formed of stainless steel plates. A side of the door 12 facing the heating chamber 20 is formed of a stainless steel plate. A heat insulator (not shown) is placed in the surrounding of the heating chamber 20 and the interior of the door 12 to insulate the inside of the heating chamber 20 from the outside.

A stainless steel-made catch pan 21 is placed at the bottom surface of the heating chamber 20, and a stainless steel wire-made rack 24 (shown in FIG. 3) for receiving an object to be cooked is placed on the catch pan 21. Further, side steam outlets 22, 22 of a roughly rectangular shape, which are longitudinally roughly level to each other (only one of the openings is shown in FIG. 2), are provided at lower portions of both lateral side surfaces of the heating chamber 20.

Figure 3:
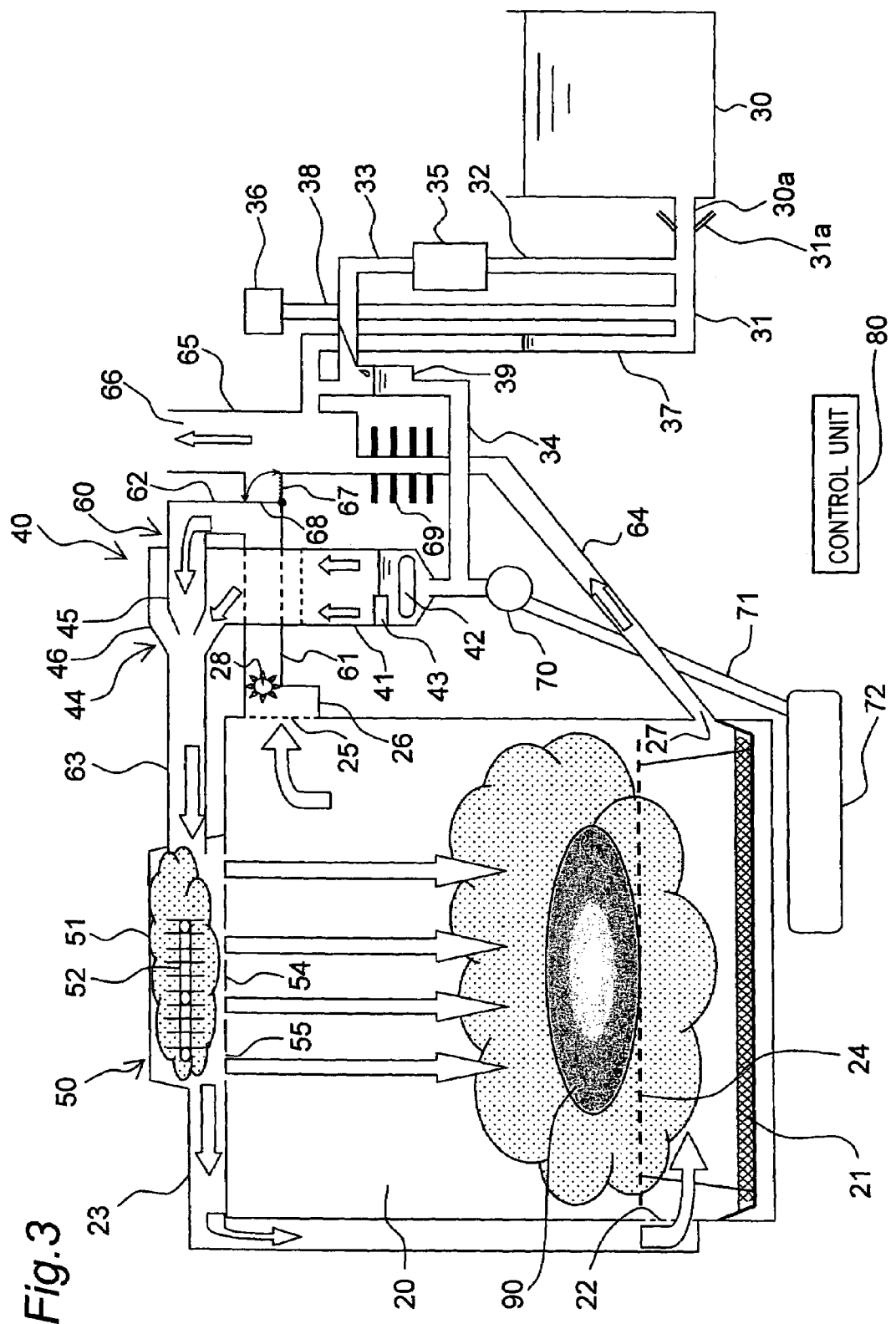
FIG. 3 is a schematic diagram showing the construction of the steam cooker shown in FIG. 1.

FIG. 3 is a schematic view showing the basic construction of the steam cooker 1. As shown in FIG. 3, the steam cooker 1 includes the heating chamber 20, a water tank 30 for storing water for steam, a steam generator 40 for evaporating water supplied from the water tank 30, a steam temperature-raising device 50 for heating steam from the steam generator 40 and a control unit 80 for controlling the steam generator 40, the steam temperature-raising device 50 and other devices.

The lattice-like rack 24 is placed on the catch pan 21 placed in the heating chamber 20, and an object 90 to be heated is placed at a roughly central portion of the rack 24.

A connecting portion 30a provided at the lower side of the water tank 30 is connectable to a funnel-like receiving port 31a provided at one end of a first water supply pipe 31. The suction side of a pump 35 is connected to an end of a second water supply pipe 32, which branches off from the first water supply pipe 31 and extends upward, and one end of a third water supply pipe 33 is connected to the discharge side of the pump 35. A water level sensor 36 for the water tank is provided at an upper end portion of a pipe 38 for the water level sensor, which pipe branches off from the first water supply pipe 31 and extends upward. Further, an upper end portion of an air releasing pipe 37 that branches off from the first water supply pipe 31 and extends upward is connected to an exhaust gas duct 65.

The third water supply pipe 33 has an L shape in which a horizontal portion is bent roughly horizontally from a vertically placed portion and an auxiliary tank 39 is connected to the other end of the third water supply pipe 33. One end of a fourth water supply pipe 34 is connected to a lower end of the auxiliary tank 39, and the other end of the fourth water supply pipe 34 is connected to a lower end of the steam generator 40. One end of a drain valve 70 is connected to the lower side of a portion of the steam generator 40, to which portion the fourth water supply pipe 34 is connected. One end of a drain pipe 71 is connected to the other end of the drain valve 70, and a water drain tank 72 is connected to the other end of the drain pipe 71. An upper portion of the auxiliary tank 39 communicates with atmosphere via the air releasing pipe 37 and the exhaust gas duct 65.

Once the water tank 30 has been connected to the receiving port 31a of the first water supply pipe 31, water rises in the air releasing pipe 37 until its water level reaches the same water level as that of the water tank 30. Since a tip of the pipe 38 connected to the water level sensor 36 for the water tank is sealed, the water level in the pipe 38 little rise, but a pressure in a sealed space in the pipe 38 for the water level sensor increases from an atmospheric pressure, depending on the water level of the water tank 30. This pressure change is detected by a pressure detection device (not shown) in the water level sensor 36 for the water tank, whereby the water level in the water tank 30 is detected. Although water level measurement does not require the air releasing pipe 37 while the pump 35 is stationary, the air releasing pipe 37 having an open end is used in order to prevent deterioration of accuracy in the detection of the water level due to direct application of a suction pressure of the pump 35 to the pressure detection device.

The steam generator 40 has a pot 41, to the lower side of which the other end of the fourth water supply pipe 34 is connected, a heater 42 placed in the vicinity of a bottom surface in the pot 41, a water level sensor 43 placed in the vicinity of the upper side of the heater 42 in the pot 41, and a steam suction ejector 44 attached to the upper side of the pot 41. A fan casing 26 is placed outside an intake opening 25 provided at an upper portion of a lateral side of the heating chamber 20. Steam in the heating chamber 20 is sucked through the intake opening 25 by a blower fan 28 placed in the fan casing 26. The sucked steam is sent to an inlet side of the steam suction ejector 44 via a first pipe 61 and a second pipe 62. The first pipe 61 is placed roughly horizontally, and its one end is connected to the fan casing 26. The second pipe 62 is roughly vertically placed, and its one end is connected to the other end of the first pipe 61, and the other end of the second pipe 62 is connected to the inlet side of an inner nozzle 45 of the steam suction ejector 44.

The steam suction ejector 44 is provided with an outer nozzle 46 that covers an outer side of the inner nozzle 45, and the discharge side of the inner nozzle 45 communicates with an internal space of the pot 41. The discharge side of the outer nozzle 46 of the steam suction ejector 44 is connected to one end of a third pipe 63 and a steam temperature-raising device is connected to the other end of the third pipe 63.

The fan casing 26, the first pipe 61, the second pipe 62, the steam suction ejector 44, the third pipe 63 and the steam temperature-raising device 50 form an external circulation passage 60. One end of a discharge passage 64 is connected to a discharge port 27 provided in a lower portion of the lateral side of the heating chamber 20, and the other end of the discharge passage 64 is connected to one end of the exhaust gas duct 65. The other end of the exhaust gas duct 65 is provided with an exhaust gas outlet 66. A radiator 69 is outwardly fitted to the exhaust gas duct 65 side of the discharge passage 64. A connection portion of the first pipe 61 and the second pipe 62 is connected to the exhaust gas duct 65 through an exhaust gas passage 67. At the connection side with the first and second pipes 61, 62, the exhaust gas passage 67 is provided with a damper 68 that opens/closes the exhaust gas passage 67.

The steam temperature-raising device 50 includes a tray-shaped case 51 placed with its opening downward on a ceiling side at a central portion of the heating chamber 20 and a steam superheater 52 placed in the tray-shaped case 51. A bottom of the tray-shaped case 51 is formed of a metallic ceiling panel 54 serving as a ceiling plane of the heating chamber 20. The ceiling panel 54 is formed with a plurality of ceiling steam outlets 55. Both upper and lower surfaces of the ceiling panel 54 give a dark color by coating and the like. The ceiling panel 54 may also be formed of a metal material that turns into a dark color by repetitive use or a dark ceramic molded product.

One end of each of steam supply passages 23 (in FIG. 3, only one of them is shown), which extend to the left and right sides of the heating chamber 20, is individually connected to the steam temperature-raising device 50. Each of the steam supply passages 23 extends downward along the side surfaces of the heating chamber 20 and the other end of each of the steam supply passages 23 is connected to side steam outlets 22, which are provided in a lower position of the lateral side of the heating chamber 20.

FIGS. 4A, 4B, 5A and 5B are views showing the construction of the steam generator 40. Next, the steam generator 40 will be described in detail with reference to FIGS. 4A, 4B, 5A and 5B.

Figure 4A:
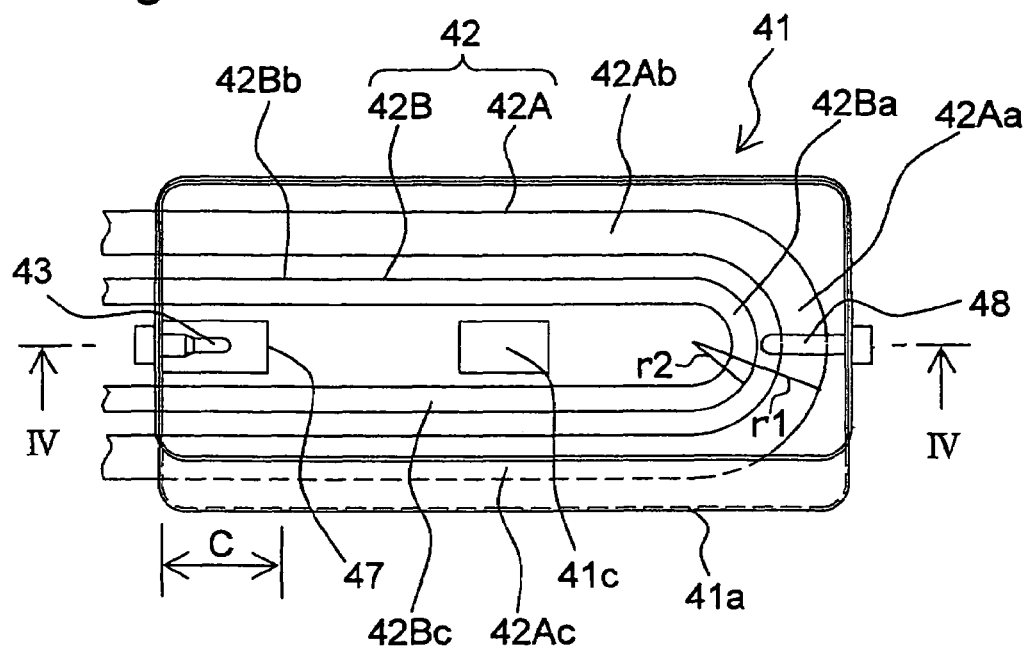
FIG. 4A is a plan view of a pot in FIG. 3.
Figure 4B:
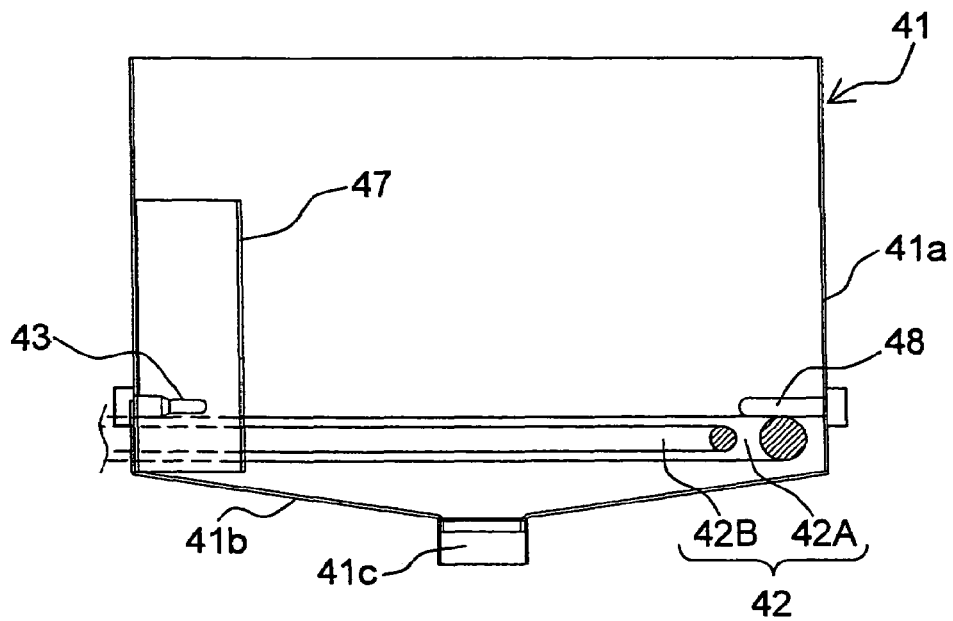
FIG. 4B is a cross sectional view taken along line IV-IV' of FIG. 4A.

FIGS. 4A and 4B are constructional views of the pot 41 of the steam generator 40, where FIG. 4A is a plan view as viewed from above and FIG. 4B is a sectional view taken along line IV-IV' of FIG. 4A.

As shown in FIGS. 4A and 4B, the pot 41 includes a cylinder portion 41a which has, in its horizontal plan view, a roughly rectangular shape, a bottom portion 41b provided on the lower side of the cylinder portion 41a and formed of an inclined plane that is gradually lowered toward a center portion of the bottom portion, and a water supply port 41c provided at a roughly center portion of the bottom portion 41b. Although the vertical to horizontal ratio of the cross-section shape of the pot 41 is 1:2.5, what is required of the planar shape is that the planar shape is an elongated shape, namely a rectangular or elliptic shape. Preferably, however, the vertical to horizontal ratio in the case of the rectangular shape is 1:2, more preferably 1:2.5, and most preferably 1:3 or less.

The heater 42 is placed in the vicinity of the bottom portion 41b in the pot 41. The heater 42 is constructed of a first steam generation heater 42A that is a U-shaped sheath heater having a larger pipe diameter and a second steam generation heater 42B that is a U-shaped sheath heater having a smaller pipe diameter, which is placed inside the first steam generation heater 42A and roughly on the same plane as the first generation heater 42A. The heater 42 is placed adjacent to sidewalls of the cylinder portion 41a of the pot 41. A minimum distance between an outer edge of the heater 42 and the sidewalls of the cylinder portion 41a is set to 2 mm to 5 mm. A lowermost portion of the heater 42 is placed adjacent to the bottom portion 41b of the pot 41. A minimum distance between a lowermost portion of the heater 42 and the bottom portion 41b of the pot 41 is set to 2 mm to 5 mm.

In this embodiment, a 700W sheath heater having a larger pipe size is used for the first steam generation heater 42A, while a 300W sheath heater having a smaller pipe size is used for the second steam generation heater 42B. The first steam generation heater 42A is comprised of a curved portion 42Aa that has a roughly semicircular arc shape, and two linear portions 42Ab, 42Ac that extend roughly parallel from both ends of the curved portion 42Aa. Likewise, the second steam generation heater 42B is comprised of a curved portion 42Ba that has a generally semicircular arc shape, and two linear portions 42Bb, 42Bc that extend roughly parallel from both ends of the curved portion 42Ba. The curved portion 42Aa of the first steam generation heater 42A has a minimum curvature radius r1, which is determined by the sheath heater having a larger pipe size to be used, while the curved portion 42Ba of the second steam generation heater 42B has a minimum curvature radius r2 (<r1), which is determined by the sheath heater having a smaller pipe size to be used.

A water level sensor 43 is placed in the vicinity of the upper side of the heater 42 in the pot 41 and at a sidewall on the side of a non-heating portion (region C of FIG. 4A) inside the second steam generation heater 42B. In the pot 41, a partition plate 47 having a square cornered U-shape in cross section, which surrounds the water level sensor 43, is provided. The partition wall 47 and the sidewall in the pot 41 form a casing having a rectangular shape in cross section. A lower end of the partition plate 47 is located on the upper side of the bottom portion 41b of the pot 41 and beneath the lowermost portions of the first and second steam generation heaters 42A, 42B. On the other hand, an upper end of the partition plate 47 is set at a level that is twice or more of a height from the lowermost portion of the heater 42 to an attaching position of the water level sensor 43. Further, a temperature sensor 48 is placed at a sidewall opposite to the water level sensor 43 in the pot 41.

The water level sensor 43 is a self-heating thermistor. In water, a temperature ranging from about 100° C. to 140° C. is detected depending on a water temperature ranging from about 20° C. to 100° C., while, in air, a temperature ranging from about 140° C. to 150° C. is detected. Based on the water temperature detected by the temperature sensor 48, the temperature detected by the water level sensor 43 is discriminated, whereby the presence or absence of water in the pot 41, namely whether or not water is present at the attaching position of the water level sensor 43 is determined.

Figure 5A:
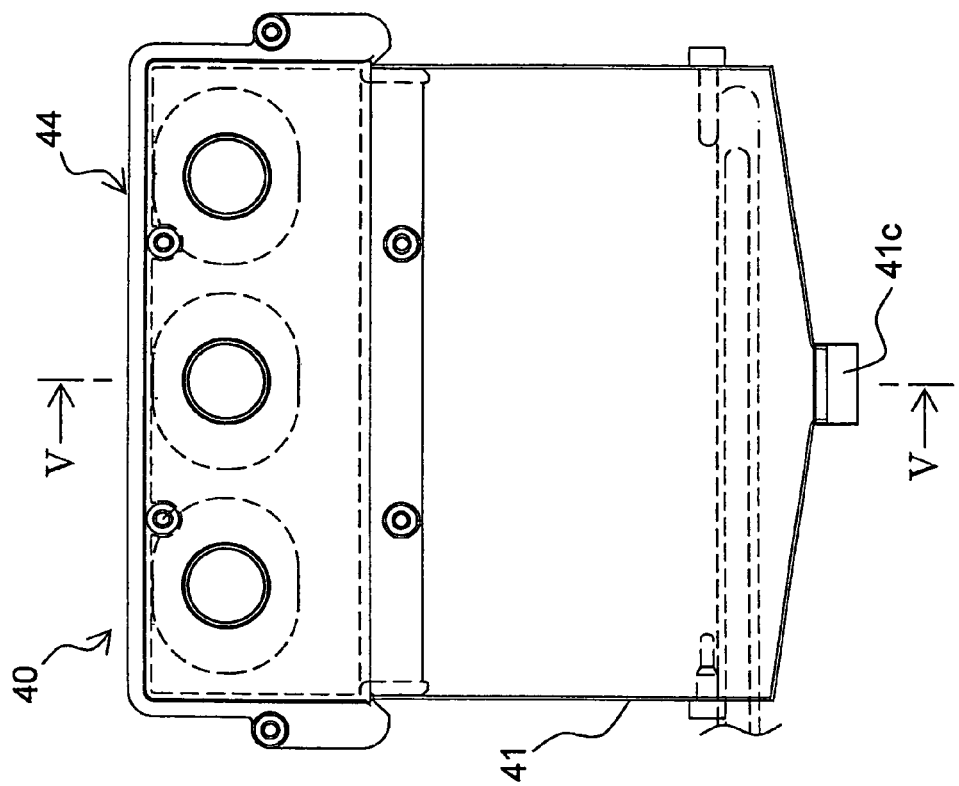
FIG. 5A is a side view of a whole steam generator of FIG. 3.
Figure 5B:
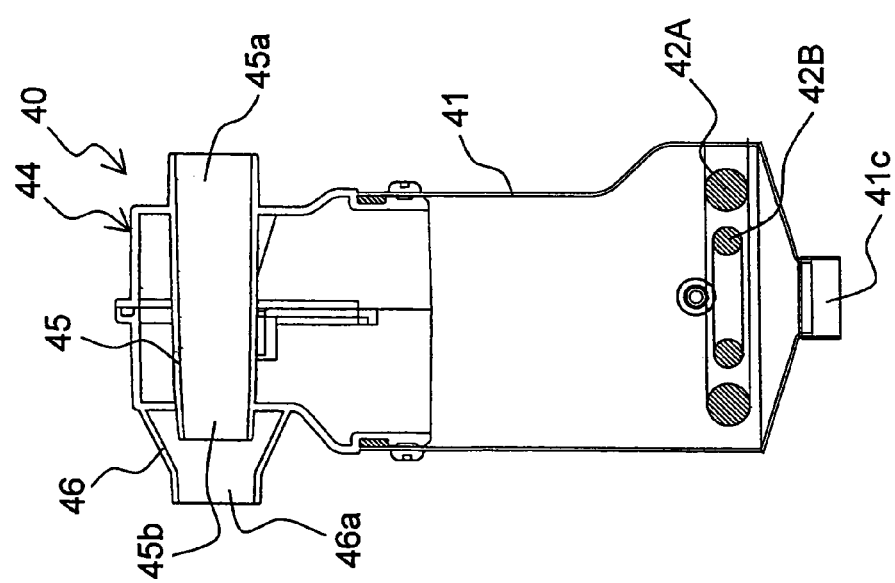
FIG. 5B is a cross sectional view taken along line V-V' of FIG. 5A.

FIGS. 5A and 5B are constructional views of the whole steam generator 40 including the pot 41, where FIG. 5A is a side view and FIG. 5B is a sectional view taken along line V-V' of FIG. 5A.

As shown in FIGS. 5A and 5B, the steam suction ejector 44 is attached in a manner so as to cover an upper side opening of the pot 41, which is internally provided with the first and second steam generation heaters 42A, 42B. A fluid (steam) flowing in from an inlet 45a of the inner nozzle 45 is discharged from a discharge opening 45b of the inner nozzle 45 and then discharged from a discharge opening 46a of the outer nozzle 46. At this time, since the discharge side of the inner nozzle 45 communicates with an internal space of the pot 41, saturated steam generated in the pot 41, which is led to the discharge opening 46a side of the outer nozzle 46, is discharged from the discharge opening 46a of the outer nozzle 46 together with steam discharged from the discharge opening 45b of the inner nozzle 45. That is, saturated steam with a temperature of 100° C. and a pressure of 1 atm. (i.e., 1013.25 hPa), which is generated by boiling water in the pot 41, is sucked into a circulating airflow that passes the external circulation passage 60 (shown in FIG. 3). By the structure of the steam suction ejector 44, saturated steam is immediately sucked up. Since no pressure is applied in the steam generator 40, discharge of saturated steam is not hindered.

Next, a control system of the steam cooker 1 will be described.

Figure 6:
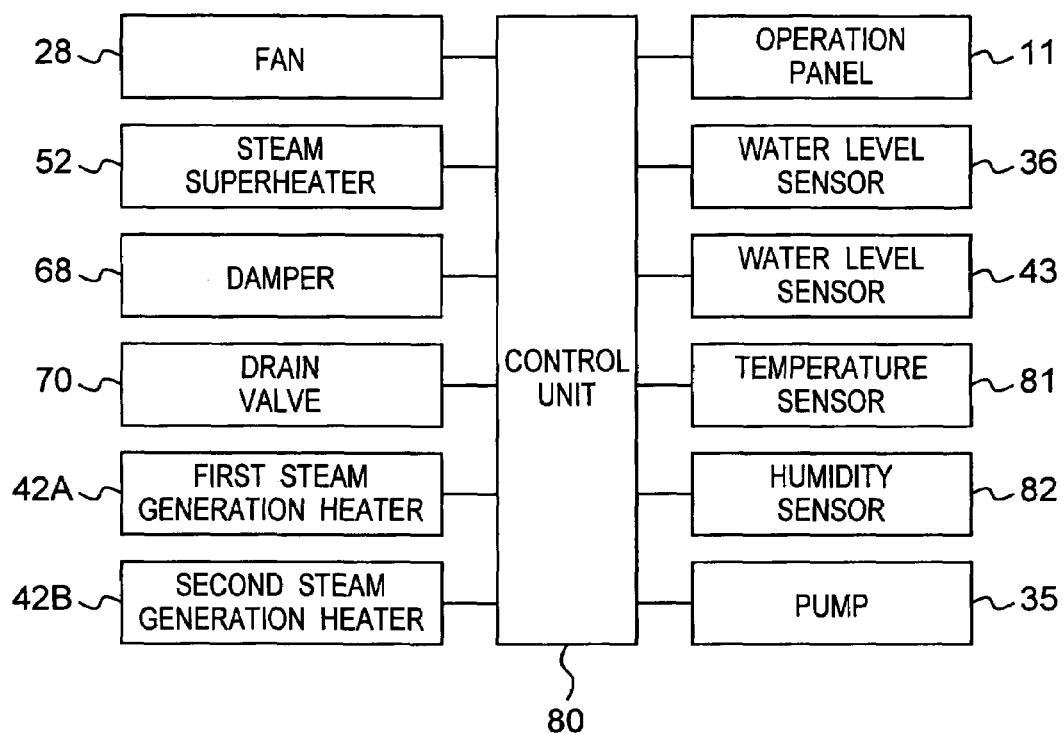
FIG. 6 is a control block diagram of the steam cooker shown in FIG. 1.

The control unit 80 is constituted by a microcomputer and an input/output circuit and so on. As shown in FIG. 6, connected to the control unit 80 are the blower fan 28, the steam superheater 52, the damper 68, the drain valve 70, the first steam generation heater 42A, the second steam generation heater 42B, the operation panel 11, the water level sensor 36 for the water tank, the water level sensor 43, a temperature sensor 81 for detecting a temperature in the heating chamber 20 (shown in FIG. 3), a humidity sensor 82 for detecting a humidity in the heating chamber 20, and the pump 35. Based on detection signals received from the water level sensor 36 for the water tank, the water level sensor 43, the temperature sensor 81, and the humidity sensor 82, the control unit 80 controls the blower fan 28, the steam superheater 52, the damper 68, the drain valve 70, the first steam generation heater 42A, the second steam generation heater 42B, the operation panel 11, and the pump 35 in accordance with a predetermined program.

Hereinbelow, operation of the steam cooker 1 having the construction shown above will be described with reference to FIGS. 6 and 3. In the steam cooker 1 with the above construction, a power switch (not shown) on the operation panel 11 is pushed to power up, and a cooking operation is started by an operation of the operation panel 11. Then, the control unit 80 first closes the drain valve 70, and starts to operate the pump 35 in a state in which the exhaust gas passage 67 is closed by the damper 68. Water is supplied by the pump 35 from the water tank 30 into the pot 41 of the steam generator 40 via the first through fourth water supply pipes 31-34. Then, when the water level sensor 43 detects that the water level in the pot 41 has reached a predetermined level, the control unit 80 stops the pump 35 to stop water supply.

Next, the first and second steam generation heaters 42A, 42B are turned on, and a predetermined amount of water stored in the pot 41 is heated by the first and second steam generation heaters 42A, 42B.

Subsequently, simultaneously with turn-on of the first and second steam generation heaters 42A, 42B, or when the water temperature in the pot 41 has reached a predetermined temperature, the blower fan 28 is turned on, and, at the same time, the steam superheater 52 of the steam temperature-raising device 50 is turned on. Then, the blower fan 28 sucks air (including steam) in the heating chamber 20 through the intake openings 25 and sends the air (including steam) to the external circulation passage 60. Since a centrifugal fan is used as the blower fan 28, it is possible to generate a higher pressure than with a propeller fan. Furthermore, the centrifugal fan used as the blower fan 28 is rotated at a high speed by a DC motor, whereby a flow rate of the circulating airflow can be highly increased.

Next, when water in the pot 41 of the steam generator 40 boils, saturated steam is generated. The generated saturated steam merges into the circulating airflow that goes through the external circulation passage 60, at the steam suction ejector 44. Steam ejected from the steam suction ejector 44 flows into the steam temperature-raising device 50 at a high speed via the third pipe 63.

Steam flowing into the steam temperature-raising device 50 is heated by the steam superheater 52 to be superheated steam of about 3000° C. (which varies depending on the type of cooking). A part of the superheated steam is jetted (i.e. emitting) downward into the heating chamber 20 from the plurality of ceiling steam outlets 55 provided in the lower ceiling panel 54. Another part of the superheated steam is jetted from the side steam outlets 22 in both of the lateral sides of the heating chamber 20 via the steam supply passages 23, which extend to the left and right sides of the steam temperature heating device 50.

Thereby, superheated steam jetted from the ceiling side of the heating chamber 20 is vigorously supplied to the object 90 side. Also, superheated steam jetted from the left and right lateral sides of the heating chamber 20 is supplied in a manner so as to wrap the object 90, while going up from the lower side of the object 90, after colliding with the catch pan 21. Thereby, a convective superheated steam flow, in which the steam blows (i.e. discharges) down into a central portion and ascends in its outer side, is generated in the heating chamber 20. The convective superheated steam flow repeats a cycle of being sucked into the intake openings 25, passing the external circulation passage 60 and returning to the inside of the heating chamber 20 again.

In this manner, it becomes possible to jet superheated steam, which is sent from the steam temperature-raising device 50, from the ceiling steam outlets 55 and the side steam outlets 22 so that it efficiently collides with the object 90, while maintaining uniform temperature, humidity distribution in the heating chamber 20 by forming a convective superheated steam flow in the heating chamber 20. Then, collision of superheated steam heats the object 90. At this time, superheated steam in contact with a surface of the object 90 heats the object 90 also by releasing latent heat that is generated when building up condensation on the surface of the object 90. Thereby, a large quantity of heat can uniformly be imparted to the entire surface of the object 90 surely and promptly. Therefore, uniform cooking that secures a good finish can be realized.

In the cooking operation, an amount of steam in the heating chamber 20 increases with a lapse of time, and an excess amount of steam is discharged from the exhaust gas outlet 66 via the discharge port 27, the discharge passage 64 and the exhaust gas duct 65. At this time, a radiator 69 provided on the discharge passage 64 cools steam passing the discharge passage 64 to form condensation, whereby steam is prevented from being discharged to the outside as such. Water condensed by the radiator 69 within the discharge passage 64 runs down the discharge passage 64, is led to the catch pan 21, and disposed of together with water generated by cooking after completion of the cooking.

After completion of the cooking, the control unit 80 displays a message of completion of the cooking on the operation panel 11, and a sound is raised by a buzzer (not shown) provided on the operation panel 11. Thereby, a user who has noticed completion of the cooking opens the door 12. Then, the control unit 80 opens the damper 68 immediately after a sensor (not shown) detects opening of the door 12. Thereby, the first pipe 61 of the external circulation passage 60 communicates with the exhaust gas duct 65 via the exhaust gas passage 67, so that steam in the heating chamber 20 is discharged by the fan 28 from the exhaust gas outlet 66 via the intake openings 25, the first pipe 61, the exhaust gas passage 67 and the exhaust gas duct 65. The operation of the damper is the same even if the user opens the door 12 while cooking. Therefore, the user can safely take out the object 90 from the inside of the heating chamber 20 without being exposed to steam.

As described above, the heating principle of this steam cooker lies in that superheated steam of 100° C. or higher is supplied to the surface of the object 90 to be cooked so that the object 90 to be cooked is fed with a large amount of thermal energy by the condensed latent heat of the superheated steam. That is, on condition that the surface temperature of the object 90 to be cooked is 100° C. or lower and that the steam jetted thereto is superheated steam of 100° C. or higher, the superheated steam deposited on the surface of the object 90 to be cooked is condensed to give condensed latent heat to the object 90 to be cooked while 100° C. water (hot water) generated by the condensation is penetrated into the object 90 to be cooked, with its internal temperature raised.

However, for heating of a bowl of rice, the above-described principle of heating of this steam cooker is inapplicable as it is. That is, each one grain of rice is small shaped. Accordingly, when superheated steam is given to rice, a large amount of heat is resultantly given to individual grains of rice, so that the surfaces of the rice grains would immediately go beyond 100° C. If the surfaces of rice grains have gone beyond 100° C., superheated steam is iteratively condensed and vaporized on the surfaces of the rice grains, finally being no longer condensable. Thus, 100° C. condensed water (hot water) cannot be penetrated into the rice grains (i.e., heat is hardly transferred to the interior), so that a reach to a temperature of 60° C. to 70° C., which is so called optimum temperature, takes about 5 minutes.

As seen from the above description, heating of a bowl of rice can be attained in shorter heating time by jetting out steam of 80° C. to 90° C. temperatures without superheating the steam. Thus, in this embodiment, a steam temperature-raising device 50 is contrived as shown below so that the food can be efficiently heated, whichever it is a small food such as in heating of a bowl of rice or a massive food having a large surface area.

Figure 7A:
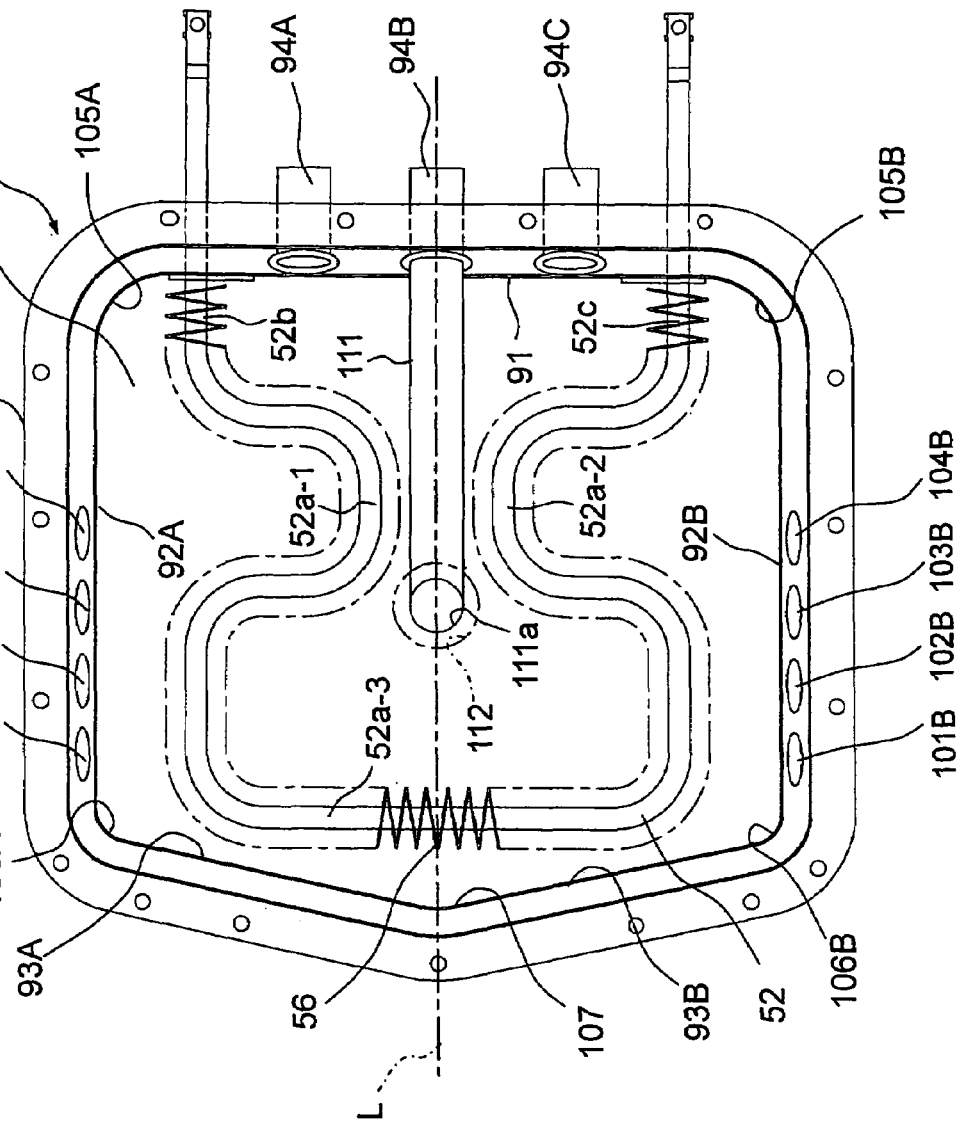
FIG. 7A is a plan view, seen from below, of a steam temperature-raising device of FIG. 3.
Figure 7B:
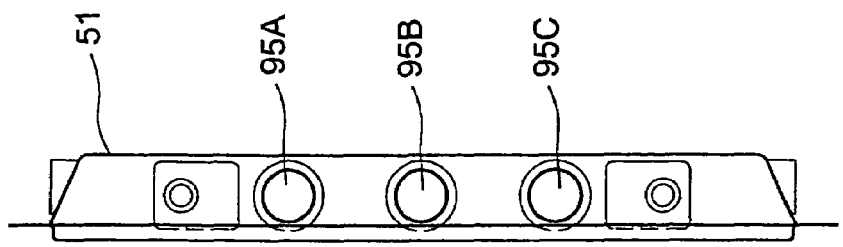
FIG. 7B is a side view of the steam temperature-raising device of FIG. 3 as viewed from a steam supply port side.

The steam temperature-raising device 50, which characterizes this embodiment, will be described below in more detail with reference to FIGS. 7A and 7B. FIG. 7A is a plan view, seen from below, of the steam temperature-raising device 50 of the steam cooker, and FIG. 7B is a side view of the steam temperature-raising device seen from the side of steam supply ports. In the steam temperature-raising device 50, as shown in FIGS. 7A and 7B, the steam superheater 52 that is a high power (1000 W) sheath heater having a larger pipe size is placed in the tray-shaped case 51 having a recessed part 51a whose planar shape is a roughly pentagonal shape. Although not shown in FIGS. 7A and 7B, the opening of the recessed part 51a of the tray-shaped case 51 is covered by the metallic ceiling panel 54 (shown in FIG. 3) provided on the ceiling plane of the heating chamber 20.

The recessed part 51a of the tray-shaped case 51 has a first sidewall 91 to which steam supply pipes 94A, 94B, 94C are connected, a second sidewall 92A which is adjacent to one side of the first sidewall 91 through a round portion 105A and is roughly perpendicular to the first sidewall 91, a third sidewall 92B which is adjacent to the other side of the first sidewall 91 through a round portion 105B and is roughly perpendicular to the first sidewall 91 and parallel to the second sidewall 92A, a fourth sidewall 93A which is adjacent to the second sidewall 92A through a round portion 106A and forms a blunt angle with the second sidewall 92A, and a fifth sidewall 93B which is adjacent to the third sidewall 92B through a round portion 106B, forms a blunt angle with the third sidewall 92B, and also forms a blunt angle with the fourth sidewall 93A. The fourth sidewall 93A and the fifth sidewall 93B are adjacent to each other through a round portion 107. In the tray-shaped case 51, the round portions 105A, 105B, 106A, 106B, 107 that are corner portions of the recessed part 51a having a curved surface are formed by drawing.

In the tray-shaped case 51, the side of the first sidewall 91 (FIG. 7A on the right) to which the steam supply pipes 94A, 94B, 94C are connected corresponds to the back side of the steam cooker 1, while the side of the forth sidewall 93A and the fifth sidewall 93B (FIG. 7A on the left) corresponds to the front side of the steam cooker 1. The steam supply pipe 94B having a steam supply port 95B is connected to a roughly central portion of the first sidewall 91, and the steam supply pipes 94A, 94C having steam supply ports 95A, 95C are connected on both sides of the steam supply pipe 94B at predetermined intervals. Steam outlets 101A, 102A, 103A, 104A are provided at predetermined intervals in the second sidewall 92A from the front side toward the back side, and at positions in the third sidewall 92B opposite to the steam outlets 101A-104A, steam outlets 101B, 102B, 103B, 104B are provided. The steam outlets 101A-104A, and the steam outlets 101B-104B are connected to the steam supply passage 23 shown in FIG. 3. The discharge side of the steam suction ejector 44 is connected to the inlet port side of the steam supply pipes 94A, 94B, 94C via the third pipe 63 shown in FIG. 3.

The steam superheater 52 has a planar shape roughly axisymmetrical with respect to the center line L of the flow of steam flowing in from the steam supply ports 95A, 95B, 95C, and includes the two non-heating portions 52b, 52c placed parallel to the center line L at a predetermined interval, roughly U-shaped first and second heating portions 52a-1, 52a-2 which are connected, at one end thereof, to the leading ends of the non-heating portions 52b, 52c and which are each curved toward the center of the recessed part 51a, and a roughly U-shaped third heating portion 52a-3 which connects the first and second heating portions 52a-1, 52a-2. Spiral heat radiation fins 56 are provided around the first to third heating portions 52a-1 to 52a-3 and a part of the first and second non-heating portions 52b, 52c of the steam superheater 52. In the steam superheater 52 having the above construction, first, second non-heating portions 52b, 52c are fixed so as to run through the first side wall 91 located outside the steam supply pipes 94A, 94C, thus being attached to the tray-shaped case 51. Then, electrical wiring lines (not shown) are connected to tip ends of the first, second non-heating portions 52b, 52c.

Figure 8:
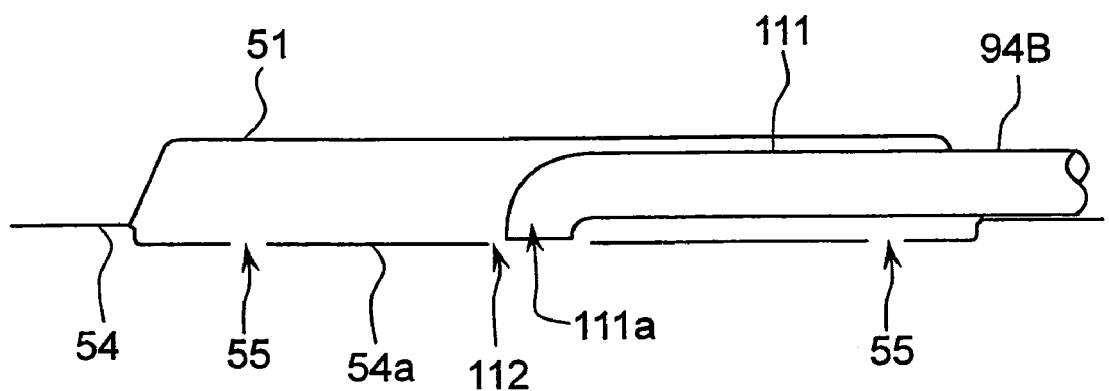
FIG. 8 is a longitudinal sectional view taken along a center line of a tray-shaped case of FIG. 7A.

FIG. 8 is a longitudinal sectional view taken along a center line L of the tray-shaped case 51. Within the recessed part 51a of the tray-shaped case, one end of a steam jet pipe 111 placed horizontal along the center line L is connected to the steam supply pipe 94B placed on the center line L. Then, the other end of the steam jet pipe 111 is bent at a generally central portion of the recessed part 51a so as to be directed toward the heating chamber 20 and located at an extremely proximity to the inner surface of a lid member 54a of the tray-shaped case 51 forming part of the ceiling panel 54. Also, a hole 112 is formed in the lid member 54a so as to surround an opening 111a of the other end of the steam jet pipe 111.

Figure 9:
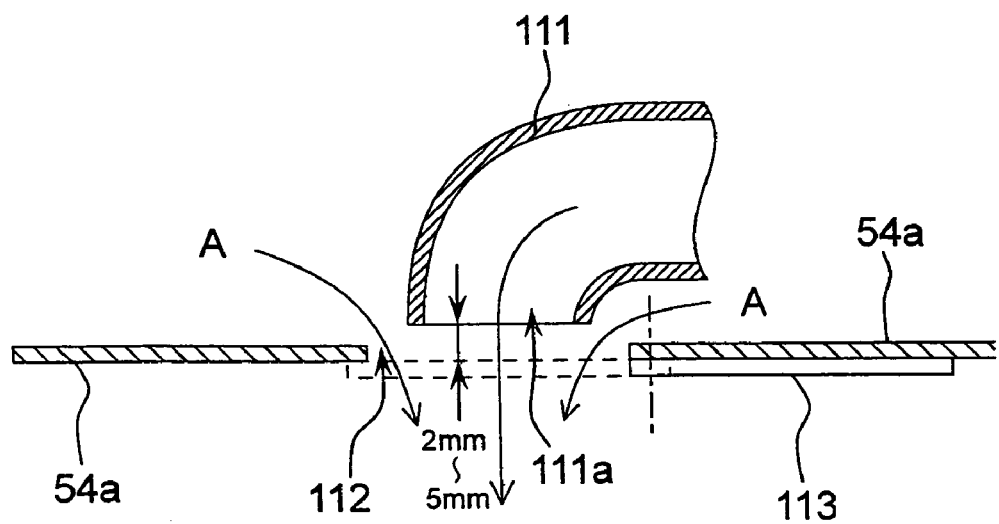
FIG. 9 is an enlarged view of a neighborhood of an opening of a steam jet pipe of FIG. 8.

FIG. 9 is an enlarged view of a neighborhood of the opening 111a of the steam jet pipe 111 of FIG. 8. The opening 111a of the steam jet pipe 111 has a circular shape with an inner diameter of 15 mm, the hole 112 of the lid member 54a has a circular shape with a diameter of 24 mm, and the opening 111a of the steam jet pipe 111 and the hole 112 of the lid member 54a are so placed as to be to concentric with each other. Accordingly, a gap is provided between the opening 111a of the steam jet pipe 111 and the hole 112 of the lid member 54a. Also, the other end of the steam jet pipe 111 is withdrawn by about 2 mm to 5 mm from the inner surface of the lid member 54a toward the steam temperature-raising device 50. Further, in this embodiment, the lid member 54a of the tray-shaped case 51 is provided with an opening/closing means 113 for opening and closing the hole 112. The concrete construction of the opening/closing means 113 is not particularly limited, and a simple construction is that the hole 112 is opened and closed, for example, by rotationally sliding a circular plate about one point of its outer peripheral portion as a rotational center, as expressed by broken line and solid line in FIG. 9.

The steam temperature-raising device 50 having the above construction operates as follows. First described is a case where a mass of small granular or thin linear objects to be cooked is heated, as in the case where a bowl of rice or a dish of chow mein is heated.

In this case, the opening/closing means 113 provided in the lid member 54a of the tray-shaped case 51 is relationally slid, by which the hole 112 of the lid member 54a is opened. Further, for example, a bowl of rice or a dish of chow mein is set on the rack 24 just under the opening 111a of the steam jet pipe 111. Then, heating and cooking is carried out by the procedure described above. In this procedure, the control unit 80 does not turn on the steam superheater 52 or does turn on the steam superheater 52 with a very weak electric power (which may be intermittent) so that steam supplied from the steam supply pipes 94A to 94C is substantially not heated.

Then, the steam of 80° C. to 90° C. supplied from the steam supply pipe 94B is jetted out right downward from the opening 111a of the steam jet pipe 111. In this connection, as shown in FIG. 9, a gap is provided the opening 111a of the steam jet pipe 111 and the hole 112 of the lid member 54a. Also, the other end of the steam jet pipe 111 is withdrawn from the inner surface of the lid member 54a by about 2 mm. Since the steam that has passed through the steam jet pipe 111 is jetted out at a very high speed from the opening 111a by the function of the steam suction ejector 44, the steam placed around the other end of the steam jet pipe 111 within the recessed part 51a is pulled in as shown by arrow (a) by the steam jetted out from opening 111a so that a large amount of steam is blown (i.e.discharged) against the bowl of rice or the dish of chow main, which is the object 90 to be cooked.

As shown above, in this embodiment, for heating of a bowl of rice as an example, not superheated steam but steam of 80° C. to 90° C. from the steam generator 40 is jetted against the object 90 to be cooked. Accordingly, the surfaces of rice grains as an example can be prevented from going beyond 100° C. so that the condensation of the steam on the surfaces of the rice grains can be achieved efficiently, and the supply of condensed latent heat and the penetration of condensed water (hot water) to the rice grains can be achieved efficiently. As a result, a bowl of rice can be heated to 60° C. to 70° C., which is so called optimum temperature, in two minutes or so.

In this connection, on condition that ceiling steam outlets 55 for jetting out the superheated steam are provided around the hole 112 of the lid member 54a, part of the steam located around the other end of the steam jet pipe 111 is jetted out also from the ceiling steam outlets 55 around the hole 112. Due to this, the jet-out effect of the steam pulled in from around the steam jet pipe 111 is lowered by the steam jetted out from the opening 111a.

Figure 10:
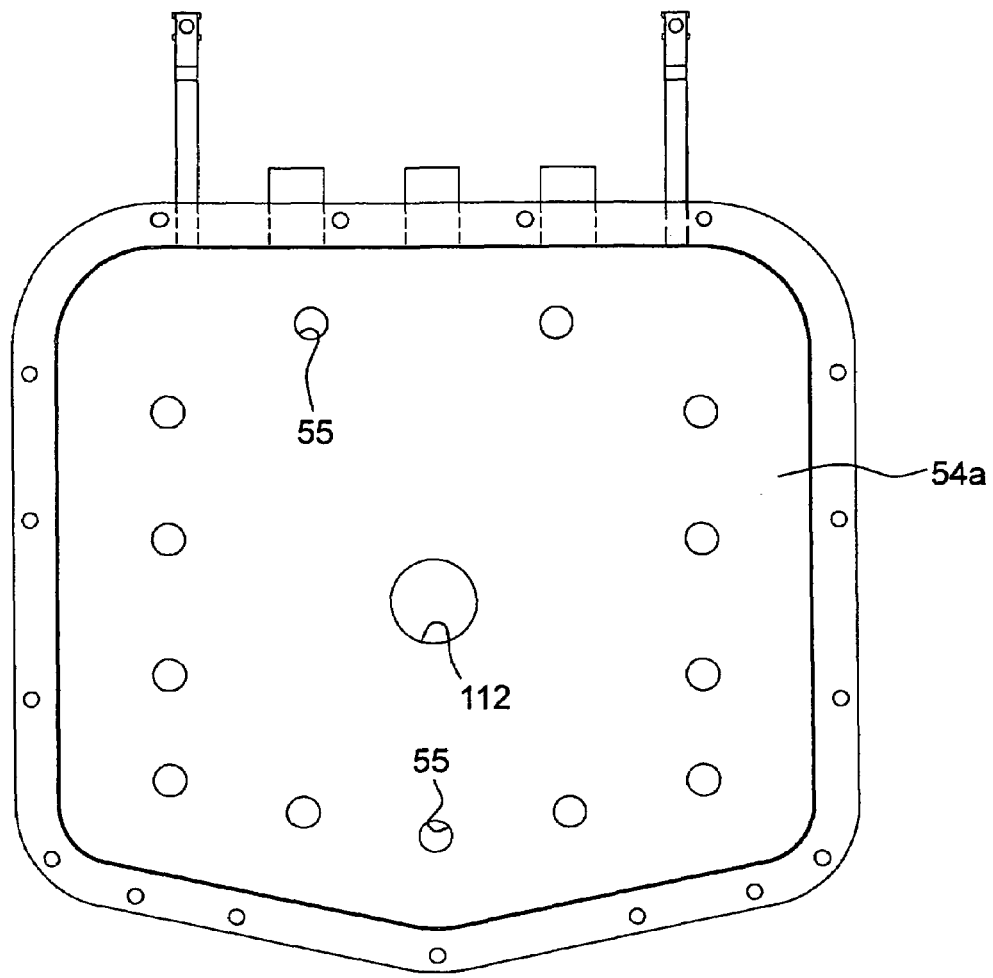
FIG. 10 is a plan view, seen from below, of the steam temperature-raising device in a state that an opening of recessed part of the tray-shaped case is covered with a lid member.

FIG. 10 is a plan view, seen from below, of the steam temperature-raising device 50 in a state that the opening of the recessed part 51a of the tray-shaped case 51 is covered with the lid member 54a. As shown in FIG. 10, in this embodiment, the ceiling steam outlets 55 are not provided within a specified radius centered on the hole 112 but provided in one line along the first to fifth of side walls 91 to 93B of the tray-shaped case 51. This makes it possible to prevent any impairment of the jet-out effect of the steam that is pulled in by the steam jetted out from the opening 111a of the steam jet pipe 111, so that a large amount of steam of 80° C. to 90° C. can be effectively jetted against the object 90 to be cooked. It is noted that the specified radius is about 50 mm, for example, when the diameter of the hole 112 is 24 mm.

Next, a description is given on where ordinary heating and cooking is carried out. In this case, the opening/closing means 113 provided in the lid member 54a of the tray-shaped case 51 is rotationally slid, by which the hole 112 of the lid member 54a is closed. Further, for example, such an object 90 to be cooked as a lump of meat is set on the rack 24. Then, heating and cooking is carried out by the procedure described above. In this procedure, the control unit 80 turns on the steam superheater 52 so that steam supplied from the steam supply pipes 94A, 94C from is heated to generate superheated steam.

After that, the steam supplied from the steam generator 40 (shown in FIG. 3) passes through the steam supply ports 95A, 95C to flow into the tray-shaped case 51. Then, the steam is heated by the steam superheater 52, causing superheated steam to be generated, and the generated superheated steam is jetted out into the heating chamber 20 from the ceiling steam outlets 55 provided in the lid member 54a in one line along the first to fifth side walls 91 to 93B of the tray-shaped case 51 as shown in FIG. 10. Further, part of the generated superheated steam is jetted out into the heating chamber 20 from the steam outlets 101A-104A, 101B-104B provided in the second, third side walls 92A, 92B opposite to each other with the center line L interposed therebetween via the steam supply passages 23 (shown in FIG. 3).

In this connection, in ordinary cooking, if the opening/closing means 113 allows the hole 112 of the lid member 54a to keep opened, steam is jetted out in a larger amount from the opening 111a of the steam jet pipe 111 located at the center of the tray-shaped case 51 and from the hole 112 of the lid member 54a, and in a smaller amount from the ceiling steam outlets 55 located around the tray-shaped case 51. As a result, it becomes harder for the steam from the steam temperature-raising device 50 to uniformly be jetted out into the heating chamber 20, which leads to occurrence of baking nonuniformities or temperature nonuniformities at central and peripheral portions of the tray-shaped case 51 in the cooking of objects 90 to be cooked having large surface areas or objects 90 to be cooked provided in large amounts.

Therefore, as the hole 112 of the lid member 54a is closed, the static pressure inside the steam jet pipe 111 is increased to such a large extent that the steam having passed through the steam jet pipe 111 is released into the recessed part 51a of the tray-shaped case 51 through the gap between the other end of the steam jet pipe 111 and the opening/closing means 113. As a result, a large amount of superheated steam is jetted out uniformly from the ceiling steam outlets 55 located around the tray-shaped case 51.

As shown above, for example, in ordinary cooking of an object 90 to be cooked having a large surface area such as a lump of meat, the hole 112 of the lid member 54a is closed so that a large amount of superheated steam heated by the steam superheater 52 is jetted from the ceiling steam outlets 55 against the object 90 to be cooked. This makes it achievable to give condensed latent heat of superheated steam to the object 90 to be cooked, and moreover to make the condensed water (hot water) of 100° C. penetrated into the object 90 to be cooked with its internal temperature raised, so that a good-finished, uniform cooking can be achieved.

The ceiling steam outlets 55 in the lid member 54a are provided in one line on the periphery in this embodiment. However, this is not limitative. In short, the ceiling steam outlets 55 should not be provided within a specified radius centered on the hole 112 in the lid member 54a so that the jet-out effect of the steam pulled in by the steam jetted out from the opening 111a is prevented from lowering.

Further, although not described in detail, switching control for switching between the cooking of a mass of small granular or thin linear objects to be cooked by not turning on the steam superheater 52 or by turning it on with a very weak electric power (which may be intermittent) and the ordinary cooking with heating by turning on the steam superheater 52 is fulfilled by the control unit 80 in compliance with instructions from the operation panel 11. That is, in this embodiment, the heater turn-on control means is implemented by the control unit 80.

Figure 11:
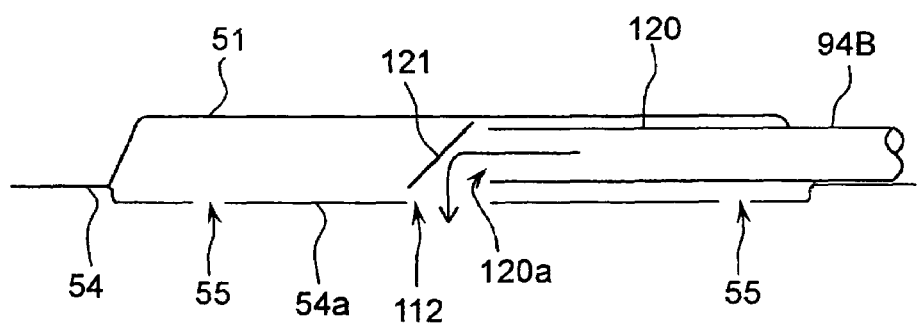
FIG. 11 is an explanatory view of a steam jet pipe different from that of FIG. 8.

In this embodiment, the steam jet pipe 111 have the other end bent toward the heating chamber 20 side. However, the invention is not limited to this, and the steam jet pipe may also be formed as shown in FIG. 11. That is, the other end side of a steam jet pipe 120 has one end, which is not connected to the steam supply pipe 94B, extending up to a generally central portion of the recessed part 51a so as to be opened. An air rectification plate 121 is further provided so as to be opposed to an opening 120a of the steam jet pipe 120 and slanted by about 45 degrees to the lid member 54a. Then, the jet-out direction of steam jetted from the opening 120a is changed by the air rectification plate 121 so as to be directed toward the hole 112 of the lid member 54.

Also, in this embodiment, the steam jet pipe 111 is provided within the tray-shaped case 51 of the steam temperature-raising device 50. However, this is not necessarily required. For example, steam derived from the steam suction ejector 44 may appropriately be led into the heating chamber 20 directly by a steam jet pipe other than the third pipe 63 without the intervention of the tray-shaped case 51.

The invention claimed is:

1. A steam cooker, comprising:
a steam generator for generating steam;
a steam temperature-raising device for raising, by a heater, a temperature of steam generated by the steam generator and supplied from a plurality of steam supply ports to generate superheated steam;
one or more steam supply pipes for leading steam generated by the steam generator to the steam supply ports of the steam temperature-raising device;
a heating chamber which has one or more steam outlets provided in its ceiling and which serves for heating one or more objects to be cooked; and
a steam jet pipe for leading steam generated by the steam generator to the heating chamber and emitting the steam into the heating chamber, wherein
the steam jet pipe which is provided within the steam temperature-raising device and whose one end is connected to any one of the plurality of steam supply ports in the steam temperature-raising device and whose other end is bent toward the heating chamber, an opening of the other end being so placed that a projection of the opening onto the ceiling of the heating chamber is positioned within the steam outlet provided at the generally center of the ceiling, and
the objects to be cooked within the heating chamber are heated by steam emitting from the steam jet pipe and superheated steam supplied from the steam temperature-raising device and discharged from the steam outlets.

2. A steam cooker, comprising:
a steam generator for generating steam;
a steam temperature-raising device for raising, by a heater, a temperature of steam generated by the steam generator and supplied from a plurality of steam supply ports to generate superheated steam; and
a heating chamber which has steam outlets provided in its ceiling and which serves for heating one or more objects to be cooked by superheated steam supplied from the steam temperature-raising device and discharged from the steam outlets, wherein
one of the steam outlets provided in the ceiling of the heating chamber is located at a generally center of the ceiling,
the steam cooker further comprising:
a steam jet pipe which is provided within the steam temperature-raising device and whose one end is connected to any one of the plurality of steam supply ports in the steam temperature-raising device and whose other end is bent toward the heating chamber, an opening of the other end being so placed that a projection of the opening onto the ceiling of the heating chamber is positioned within the steam outlet provided at the generally center of the ceiling; and
heater turn-on control means for turning on and off the heater, wherein
the object to be cooked within the heating chamber can be heated also by steam derived from the steam jet pipe.

3. The steam cooker according to claim 2, wherein
a diameter of the steam outlet provided at the generally center of the ceiling in the heating chamber is larger than an outside diameter of the opening of the other end of the steam jet pipe, and
the other end of the steam jet pipe is located closer to the steam temperature-raising device than the steam outlet provided at the generally center of the ceiling in the heating chamber.

4. The steam cooker according to claim 3, further comprising:
a steam suction ejector for sucking steam generated by the steam generator and discharging the steam to each of the steam supply ports in the steam temperature-raising device.

5. The steam cooker according to claim 2, further comprising:
opening/closing means for opening and closing the steam outlet provided at the generally center of the ceiling of the heating chamber.

6. The steam cooker according to claim 2, wherein
out of the steam outlets provided in the ceiling of the heating chamber, one or more steam outlets other than the steam outlet provided at the generally center of the ceiling are provided outside a region having a specified radius centered on the steam outlet provided at the generally center of the ceiling.

7. A steam cooker, comprising:

a steam generator for generating steam;

a steam temperature-raising device for raising, by a heater, a temperature of steam generated by the steam generator and supplied from a plurality of steam supply ports to generate superheated steam; and a heating chamber which has steam outlets provided in its ceiling and which serves for heating an object to be cooked by superheated steam supplied from the steam temperature-raising device and discharged from the steam outlets, wherein one of the steam outlets provided in the ceiling of the heating chamber is provided at a generally center of the ceiling, the steam cooker further comprising:

a steam jet pipe which is provided within the steam-temperature raising device and whose one end is connected to any one of the plurality of steam supply ports in the steam-temperature raising device and whose other end extends up to a generally central portion of the ceiling in the heating chamber and is opened;

an air rectification plate which is provided opposite to the other-end side open end of the stem of the pipe and which serves for changing a jet-out direction of steam emitted from the steam jet pipe to a direction toward the steam outlet provided at the generally center of the ceiling;

heater turn-on control means for turning on and off the heater, wherein the object to be cooked within the heating chamber can be heated also by steam supplied via the steam jet pipe and the air rectification plate.

8. A steam cooker, comprising:

a steam generator for generating steam;

a steam temperature-raising device for raising, by a heater, a temperature of steam generated by the steam generator to generate superheated steam, a heating chamber which has a central outlet provided in a central area of a ceiling of the heating chamber and peripheral outlets provided in a peripheral area of the ceiling and which serves for heating one or more objects to be cooked; and further comprising:

a first mode for discharging from the central outlet the steam generated by the steam generator without heating into superheated steam; and a second mode for discharging from the peripheral outlets provided in the peripheral area of the ceiling of the heat chamber the superheated steam generated by heating the steam generated by the steam generator with the steam temperature-raising device.

9. The steam cooker according to claim 8, wherein an amount of the steam discharged from the central outlet of the ceiling of the heating chamber in the first mode is more than that from the peripheral outlets of the ceiling of the heating chamber in the first mode.

10. The steam cooker according to claim 8, wherein an amount of the superheated steam discharged from the peripheral outlets of the ceiling of the heating chamber in the second mode is more than that from the peripheral outlets of the ceiling of the heating chamber in the first mode.

11. The steam cooker according to claim 8, wherein the central outlet of the ceiling of the heating chamber is closed in the second mode.

\* \* \* \* \*